United States Patent
Li et al.

(10) Patent No.: US 9,622,109 B2
(45) Date of Patent: Apr. 11, 2017

(54) METHOD, DEVICE, TERMINAL, AND SYSTEM FOR CONTROLLING ACCESS OF MULTIPLE TERMINALS

(71) Applicant: HUAWEI TECHNOLOGIES CO., LTD., Shenzhen (CN)

(72) Inventors: Yue Li, Beijing (CN); Song Zhu, Beijing (CN); Jie Ma, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 391 days.

(21) Appl. No.: 14/046,045

(22) Filed: Oct. 4, 2013

(65) Prior Publication Data

US 2014/0036670 A1 Feb. 6, 2014

Related U.S. Application Data

(63) Continuation of application No. PCT/CN2012/073534, filed on Apr. 5, 2012.

(30) Foreign Application Priority Data

Apr. 7, 2011 (CN) .......................... 2011 1 0086754

(51) Int. Cl.
  H04W 48/18 (2009.01)
  H04W 28/02 (2009.01)

(52) U.S. Cl.
  CPC ....... *H04W 28/0268* (2013.01); *H04W 48/18* (2013.01)

(58) Field of Classification Search
  None
  See application file for complete search history.

(56) References Cited

U.S. PATENT DOCUMENTS

| 5,771,453 A | 6/1998 | Haartsen |
| 2004/0259528 A1* | 12/2004 | Gandhi ................. H04W 48/06 455/411 |

(Continued)

FOREIGN PATENT DOCUMENTS

| CA | 2535707 | 2/2005 |
| CN | 1193448 | 9/1998 |

(Continued)

OTHER PUBLICATIONS

International Search Report mailed Jul. 12, 2012 in corresponding International Application No. PCT/CN2012/073534.

(Continued)

*Primary Examiner* — Hassan Phillips
*Assistant Examiner* — Gautam Sharma
(74) *Attorney, Agent, or Firm* — Staas & Halsey LLP (57) ABSTRACT

The present invention discloses a method, device, terminal, and system for controlling access of multiple terminals, and belongs to the field of communications. The method includes: receiving an access request, where the access request carries a classification identifier (101); setting up a public bearer for a terminal corresponding to the classification identifier (102); and notifying the terminal corresponding to the classification identifier, so that the terminal corresponding to the classification identifier accesses a network through the public bearer (103). The terminal includes a third sending module, a second receiving module, and an access module. The system includes a network element at an access side and a terminal. In the present invention, a signaling storm can be avoided, a load of a network can be reduced, and QoS quality of service can be improved.

18 Claims, 7 Drawing Sheets

(56) References Cited

U.S. PATENT DOCUMENTS

| | | |
|---|---|---|
| 2007/0297593 A1 | 12/2007 | Qiang |
| 2008/0091807 A1 | 4/2008 | Strub et al. |
| 2009/0175215 A1* | 7/2009 | Chen .................. H04W 76/022 370/328 |
| 2011/0249608 A1 | 10/2011 | Fischer |
| 2012/0087360 A1* | 4/2012 | Chen .................. H04W 76/022 370/338 |
| 2012/0088495 A1* | 4/2012 | Tsai .................... H04W 76/027 455/422.1 |
| 2013/0148607 A1 | 6/2013 | Yu et al. |

FOREIGN PATENT DOCUMENTS

| | | |
|---|---|---|
| CN | 1581801 | 2/2005 |
| CN | 1665237 | 9/2005 |
| CN | 101094494 | 12/2007 |
| CN | 101176330 | 5/2008 |
| CN | 101383989 A | 3/2009 |
| CN | 101496310 | 7/2009 |
| CN | 102045867 | 5/2011 |
| CN | 102076028 | 5/2011 |
| CN | 102377803 | 3/2012 |
| CN | 102378394 | 3/2012 |
| WO | WO 2011/0055461 | 1/2011 |
| WO | WO 2012/0041363 | 4/2012 |

OTHER PUBLICATIONS

International Search Report issued on Apr. 5, 2012 in corresponding International Application No. PCT/CN2012/073534.
"3rd Generation Partnership Project; Technical Specification Group Radio Access Network; Evolved Universal Terrestrial Radio Access (E-UTRA); Radio Resource Control (RRC); Protocol Specification" 3GPP TS 36.331. 3GPP. Mar. 2011.
"3rd Generation Partnership Project; Technical Specification Group Radio Access Network; Radio Resource Control (RRC); Protocol Specification" 3GPP TS 25.331 3GPP. Mar. 2011.
Vialén, J., *Radio Interface Protocols*, WCDMA for UMTS, 2000, XP-002266796, pp. 121-142.
Hsu, Y., *Shared GTP Tunnels for Multicast Data in 3G Networks*, 2004 IEEE, pp. 2768-2771.
*The group bearer for MTC*, 3GPP TSG SA WG2 Meeting #78, TD S2-100995, Feb. 22-26, 2010, San Francisco, USA, pp. 1-2.
*Network Improvement for Group Based Policing*, 3GPP TSG SA WG2 Meeting #78, TD S2-101079, Feb. 22-26, 2010, San Francisco, USA, pp. 1-3.
Extended European Search Report, dated Feb. 12, 2014, in corresponding European Application No. 12767702.9 (10 pp.).
TD S2-101168, "APN based Policing solution for MTC Groups", Temporary Document for: Approval at 3GPP TSG SA WG2 Meeting #78, Feb. 22-26, 2010, pp. 1-8, Agenda Item 9.7, Ericsson with ST-Ericsson, San Francisco, USA.
TD S2-101083, "MTC group subscription", Temporary Document for: Approval at 3GPP TSG SA WG2 Meeting #78, Feb. 22-26, 2010, pp. 1-6, Agenda Item 9.7, Huawei, San Francisco, USA.
Chinese Office Action issued Apr. 23, 2014, in corresponding Chinese Patent Application No. 201110086754.X.
European Office Action dated Aug. 16, 2016 in corresponding European Patent Application No. 12 767 702.9, 7 pages.
"3rd Generation Partnership Project; Technical Specification Group and System Aspects; General Packet Radio Services (GPRS) enhancements for Evolved Universal Terrestrial Radio Access Network (E-UTRAN) access (Release 10)", 3GPP TS 23.401 V 10.2.1, 3GPP Organizational Partners, Jan. 2011, Valbonne, France, 276 pages.

* cited by examiner

METHOD, DEVICE, TERMINAL, AND SYSTEM FOR CONTROLLING ACCESS OF MULTIPLE TERMINALS

CROSS-REFERENCE TO RELATED APPLICATIONS

This application is a continuation of International Application No. PCT/CN2012/073534, filed on Apr. 5, 2012, which claims priority to Chinese Patent Application No. 201110086754.X, filed on Apr. 7, 2011, both of which are hereby incorporated by reference in their entireties.

TECHNICAL FIELD

The present invention relates to the field of communications, and in particular, to a method, device, terminal, and system for controlling access of multiple terminals.

BACKGROUND

The Internet of Things connects all objects to a network through an information sensing device, so as to implement intelligent identification and management. A huge number of terminals exist in the Internet of Things, and each terminal can be connected to a network only by accessing the network.

Terminals in the Internet of Things include a UMTS (Universal Mobile Telecommunications System, universal mobile telecommunications system) terminal and an LTE (Long Term Evolution, long term evolution) terminal. If a UMTS terminal is to access a network, the UMTS terminal can access the network only by performing uplink and downlink signaling interaction with the network for 13 times; and if an LTE terminal accesses a network, the LTE terminal can access the network only by performing uplink and downlink signaling interaction with the network for 7 times.

During the implementation of the present invention, the inventor finds that the prior art has at least the following problems:

Each terminal can access a network only by performing uplink and downlink signaling interaction for multiple times, and that a massive number of terminals intensively access a network frequently occurs in the Internet of Things, and therefore, a signaling storm is caused, and a load of the network is increased, and QoS (Quality of Service, quality of service) is lowered.

SUMMARY

In order to avoid a signaling storm, reduce a load of a network, and improve quality of service (QoS), embodiments of the present invention provide a method, device, terminal, and system for controlling access of multiple terminals.

In one aspect, the present invention provides a control method for access of multiple terminals, where the control method includes:
receiving an access request, where the access request carries a classification identifier;
setting up a public bearer for a terminal corresponding to the classification identifier; and
notifying the terminal corresponding to the classification identifier, so that the terminal corresponding to the classification identifier accesses a network through the public bearer.

In another aspect, the present invention provides a control device for access of multiple terminals, where the control device includes:
a receiving module, configured to receive an access request, where the access request carries a classification identifier;
a setup module, configured to set up a public bearer for a terminal corresponding to the classification identifier; and
a notifying module, configured to notify the terminal corresponding to the classification identifier, so that the terminal corresponding to the classification identifier accesses a network through the public bearer.

In another aspect, the present invention provides a control method for access of multiple terminals, where the method includes:
sending an access request, where the access request carries a classification identifier;
receiving a notification that is sent after a network element at an access side sets up a public bearer for a terminal corresponding to the classification identifier; and
accessing a network through the public bearer according to an indication of the notification.

In another aspect, the present invention provides a terminal, where the terminal includes:
a third sending module, configured to send an access request, where the access request carries a classification identifier;
a second receiving module, configured to receive a notification that is sent after a network element at an access side sets up a public bearer for a terminal corresponding to the classification identifier; and
an access module, configured to access a network through the public bearer according to an indication of the notification.

In another aspect, the present invention provides a control system for access of multiple terminals, where the control system includes a network element at an access side and a terminal, where
the network element at the access side is configured to receive an access request, where the access request carries a classification identifier; set up a public bearer for a terminal corresponding to the classification identifier; and notify the terminal corresponding to the classification identifier; and
the terminal is configured to send the access request; receive a notification of the network element at the access side; and access a network through the public bearer according to an indication of the notification.

An access request carrying a classification identifier is received, and a public bearer is set up for a terminal corresponding to the classification identifier, so that the terminal accesses a network through the public bearer that is set up. In this way, each terminal corresponding to the same classification identifier can access a network without performing signaling interaction with the network for multiple times, so that a signaling storm can be avoided, a load of a network can be reduced, and QoS quality of service can be improved.

DESCRIPTION OF EMBODIMENTS

The following descriptions are used for description rather than limitation. Specific details such as a structure of a specific system, an interface, and a technology are provided for thoroughly understanding the present invention. However, persons skilled in the art should be clear that, the present invention can also be implemented in other embodiments without these specific details. In other cases, detailed descriptions about a well-known device, circuit, and method are omitted, so as to avoid that unnecessary details interfere with describing the present invention.

The technical solutions of the present invention can be applied to various communications systems, for example, a GSM, a code division multiple access (CDMA, Code Division Multiple Access) system, wideband code division multiple access (WCDMA, Wideband Code Division Multiple Access) system, UMTS, a general packet radio service (GPRS, General Packet Radio Service) system, long term evolution (LTE, Long Term Evolution) system, and so on.

A base station may be a base station (BTS, Base Transceiver Station) in the GSM or CDMA, may also be a base station (NodeB) in the WCDMA, and may also be an evolved base station (eNB or e-NodeB, NodeBevolved NodeB) in the LTE, which is not limited in the present invention; however, for convenience of description, in the following embodiments, a NodeB is taken as an example for description.

A base station controller may be a base station controller (BSC, base station controller) in the GSM or CDMA, and may also be a radio network controller (RNC, Radio Network Controller) in the UMTS, which is not limited in the present invention; however, for convenience of description, in the following embodiments, an RNC in a UMTS communications system is taken as an example for description, and an eNB in an LTE communications system is taken as an example for description.

Figure 1:
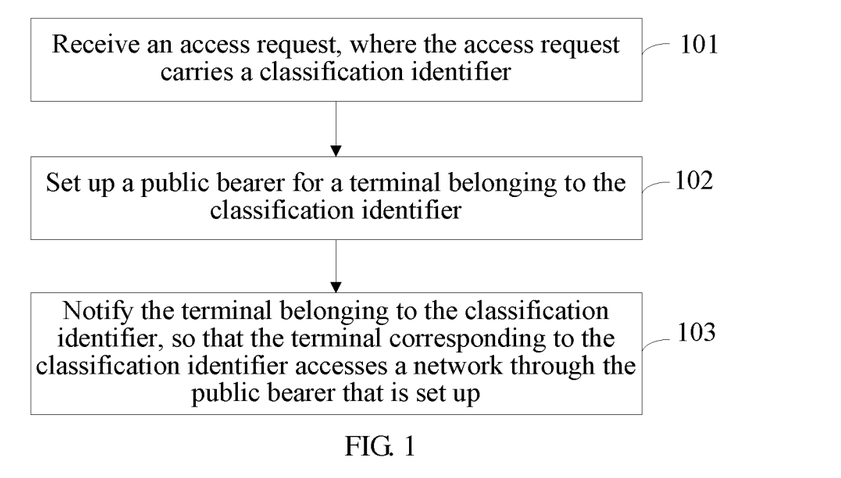
FIG. 1 is a flowchart of a control method for access of multiple terminals according to an embodiment of the present invention.

As shown in FIG. 1, an embodiment of the present invention provides a control method for access of multiple terminals, which is as follows.

101: Receive an access request, where the access request carries a classification identifier.

102: Set up a public bearer for a terminal corresponding to the classification identifier.

103 Notify the terminal corresponding to the classification identifier, so that the terminal corresponding to the classification identifier accesses a network through the public bearer that is set up.

In the embodiment of the present invention, an access request carrying a classification identifier is received, and a public bearer is set up for a terminal corresponding to the classification identifier, so that the terminal accesses a network through the public bearer that is set up. In this way, each terminal corresponding to the same classification identifier can access a network without performing signaling interaction with the network for multiple times, so that a signaling storm can be avoided, a load of a network can be reduced, and QoS quality of service can be improved.

Figure 2:
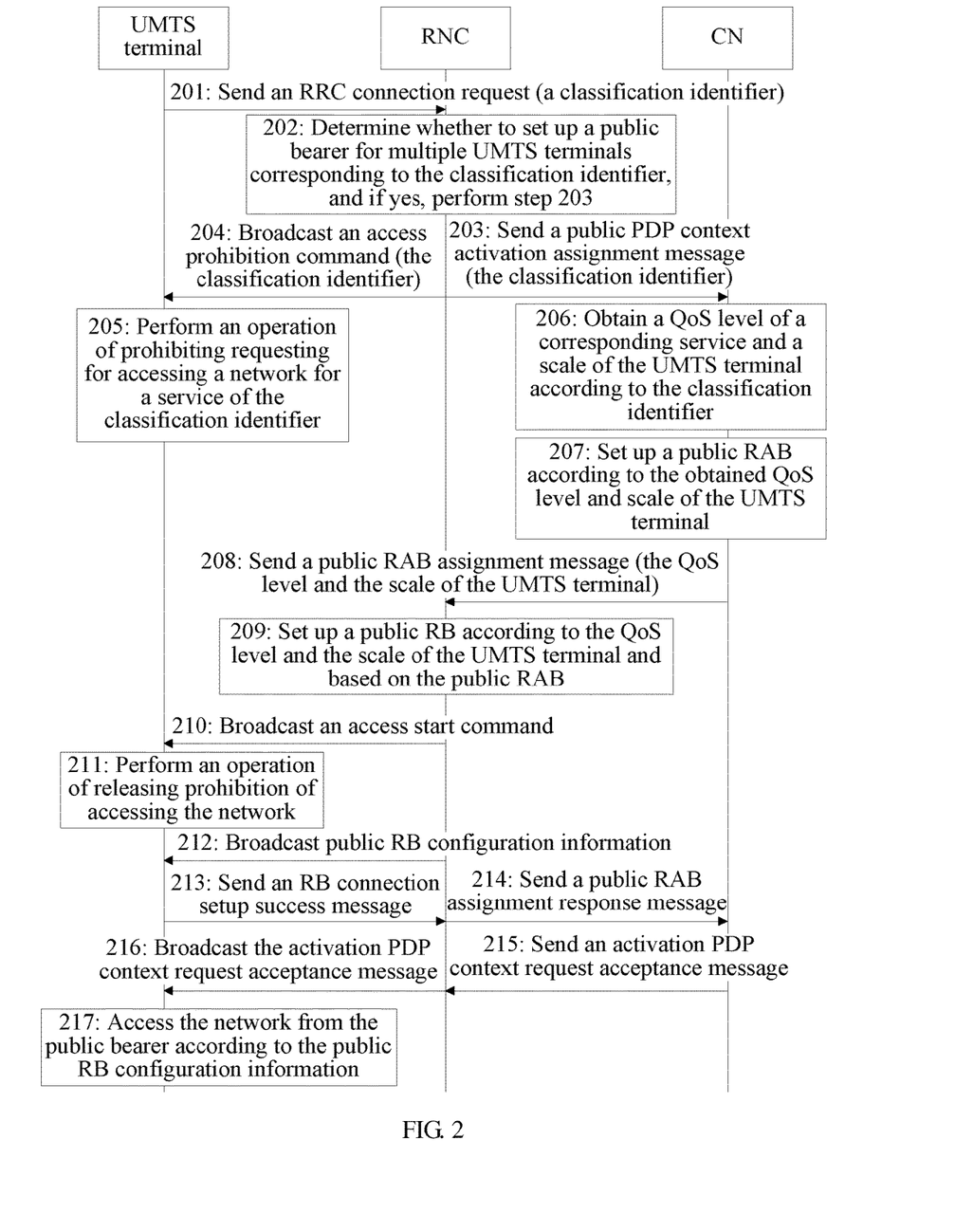
FIG. 2 is a flowchart of a control method for access of multiple terminals according to another embodiment of the present invention.

Another embodiment of the present invention provides a control method for access of multiple terminals. The present invention is applied to a UMTS system, as shown in FIG. 2.

201: A UMTS terminal sends an RRC (Radio Resource Control, radio resource control protocol) connection request to an RNC (Radio Network Controller, radio network controller), where the RRC connection request carries a classification identifier that is for the UMTS terminal to process a service.

A terminal in a UMTS system is called a UMTS terminal, and when processing a certain service, a UMTS terminal needs to report the service processed by the UMTS terminal to a network. Before reporting the service processed by the UMTS terminal, first the UMTS terminal needs to set up a connection with the network to access the network. When the UMTS terminal requests for setting up a connection with the network, first sent uplink signaling is an RRC connection request.

In the UMTS system, each UMTS terminal can process one or more kinds of services, for a service, multiple UMTS terminals processing the service centrally process the service and report the service to a network in a certain period of time, where the period of time is a time window corresponding to the service, that is, the multiple terminals processing the service centrally process the service and request for accessing the network in the time window corresponding to the service, and then centrally report the service in the time window corresponding to the service.

In this embodiment, when being powered on and started, each UMTS terminal sends registration information to a core network (CN) (Core Network, core network), where the registration information carries a classification identifier that is for the UMTS terminal to process a service. After receiving the registration information sent by each UMTS terminal, the CN determines, according to a classification identifier carried in each registration information, a scale of a UMTS terminal corresponding to each kind of classification identifier.

Each kind of service has a QoS level. In this embodiment, a time window corresponding to each kind of service, a scale of a UMTS terminal, and a QoS level are used as service information of each kind of service, and in this embodiment, correspondence between a classification identifier and service information of each kind of service is pre-stored in a core network (CN) and an RNC.

The RRC connection request may be an RRC connection request; and the classification identifier may be a service type.

202: The RNC receives the RRC connection request, and determines whether to set up a public bearer for multiple UMTS terminals corresponding to the classification identifier carried in the RRC connection request, and if yes, performs 203.

For example, the RNC receives the RRC connection request, obtains, according to the classification identifier carried in the RRC connection request, a time window included in corresponding service information from preconfigured correspondence between a classification identifier and service information, and determines, according to the obtained time window, whether to set up the public bearer for the multiple UMTS terminals corresponding to the classification identifier.

For example, an operation of determining, according to the obtained time window, whether to set up the public bearer for the multiple UMTS terminals corresponding to the classification identifier may specifically be: obtaining time for receiving the RRC connection request, and determining whether the obtained time is in the obtained time window included in the service information, and if yes, determining to set up the public bearer for the multiple UMTS terminals corresponding to the classification identifier.

If it is determined that the obtained time is not in the obtained time window included in the service information, it may be that a single UMTS terminal processes a service corresponding to the classification identifier rather than that the multiple UMTS terminals corresponding to the classification identifier process the service corresponding to the classification identifier.

In another embodiment of the present invention, when the RNC determines to set up the public bearer for the multiple UMTS terminals corresponding to the classification identifier, the RNC neglects, in a first preset time threshold, an RRC connection request that carries the classification identifier and is sent by a UMTS terminal corresponding to the classification identifier. The first preset time threshold is greater than or equal to time for setting up the public bearer.

Therefore, when determining to set up the public bearer for the multiple UMTS terminals corresponding to the classification identifier, the RNC starts timing, and if a timing period is in the first preset time threshold, and the RNC receives an RRC connection request that carries the classification identifier and is sent by another UMTS terminal, the RNC directly neglects the RRC connection request that carries the classification identifier.

203: The RNC sends a public PDP (Packet Data Protocol, packet data protocol) context activation assignment message to a core network (CN), where the public PDP context activation assignment message carries the classification identifier.

The RNC replaces a UMTS terminal that is in a same cell and belongs to the classification identifier to send a public PDP context activation assignment message to the CN, where the public PDP context activation assignment message is used to request the CN to set up a public RAB (Radio Access Bearer, radio access bearer) for the multiple UMTS terminals corresponding to the classification identifier, that is, used to request the CN to set up a public RAB connecting the CN, the RNC, and the multiple UMTS terminals corresponding to the classification identifier.

For example, the public PDP context activation assignment message may be Common PDP activation.

204: The RNC broadcasts an access prohibition command, where the broadcast access prohibition command carries the classification identifier.

In another embodiment of the present invention, before broadcasting the access prohibition command, the RNC may further obtain a UMTS terminal corresponding to the classification identifier from the CN, and notify, by paging the UMTS terminal corresponding to the classification identifier, the UMTS terminal corresponding to the classification identifier to prepare to receive the access prohibition command, and then the RNC broadcasts the access prohibition command.

In this embodiment, 203 and 204 may occur at the same time, and there is no time sequence for performing 203 and 204.

205: The UMTS terminal receives the access prohibition command, and the UMTS terminal corresponding to the classification identifier performs an operation of prohibiting requesting for accessing a network for a service corresponding to the classification identifier.

For example, the UMTS terminal receives the access prohibition command, determines, according to the classification identifier carried in the access prohibition command, whether the UMTS terminal is a terminal corresponding to the classification identifier, and if yes, performs an operation of prohibiting itself from continuously requesting for accessing a network for a service corresponding to the classification identifier, that is, prohibiting retransmitting the RRC connection request carrying the classification identifier to the RNC.

For example, for a UMTS terminal that does not belong to the classification identifier through determination, the received access prohibition command is directly discarded. For a UMTS terminal that belongs to the classification identifier through determination, if a service of another classification identifier is further processed, a network may be continuously requested to be accessed for the service of another classification identifier.

For example, in this embodiment, by broadcasting the access prohibition command, the RNC enables the UMTS terminal corresponding to the classification identifier to stop continuously requesting for accessing a network for a service corresponding to the classification identifier, that is, stop the UMTS terminal corresponding to the classification identifier from performing uplink and downlink signaling interaction with the network. In addition, the RNC further replaces the multiple UMTS terminals corresponding to the classification identifier to send a public PDP context activation assignment message to the CN and request the CN to set up a public bearer, so that a signaling storm is avoided, a load of a network is reduced, and a QoS level is improved.

For example, in this embodiment, the RNC may also set that a paging (paging) message or another message carries the classification identifier, and then notify, through the Pageing message or another message, the UMTS terminal corresponding to the classification identifier to prohibit requesting for accessing the network for the service corresponding to the classification identifier.

For example, in this embodiment, the RNC may also not perform 204 and 205, but when the RNC determines to set up a public bearer for a terminal corresponding to the classification identifier, the RNC sends a public PDP context activation assignment message to the CN, and neglects, in first preset time, an RRC connection request that carries the classification identifier and is sent by another UMTS terminal, and then, 206 is directly performed.

206: The CN receives the public PDP context activation assignment message, obtains, according to the classification identifier carried in the public PDP context activation assignment message, a QoS level of a corresponding service and a scale of the UMTS terminal corresponding to the classification identifier.

For example, the CN receives the public PDP context activation assignment message, and obtains, according to the classification identifier carried in the public PDP context activation assignment message, a QoS level and a scale of a UMTS terminal that are included in corresponding service information from stored correspondence between a classification identifier and service information.

207: The CN sets up, according to the obtained QoS level and scale of the UMTS terminal, a public RAB for the multiple UMTS terminals corresponding to the classification identifier.

For example, the public RAB connects the CN, the RNC, and the multiple UMTS terminals corresponding to the classification identifier.

208: In a process of setting up the public RAB, the CN sends a public RAB assignment message to the RNC, where the public RAB assignment message carries the obtained QoS level and scale of the UMTS terminal.

For example, the public RAB assignment message may further carry a parameter of an Iu interface through which the public RAB passes.

For example, a public RAB setup message may be Common RAB Assignment Request or MTC session Start.

209: The RNC sets up, according to the QoS level and the scale of the UMTS terminal that are carried in the public RAB assignment message, based on the public RAB set up by the CN, a public RB (Radio Bearer, radio bearer) on an air interface, and in this way, the setup of the public bearer is completed.

For example, the RNC determines first public RB configuration information according to the QoS level and the scale of the UMTS terminal that are carried in the public RAB assignment message, obtains a current congestion situation of the RNC, determines second public RB configuration information according to the obtained congestion situation, and if the number of resources required by the first public RB configuration information is smaller than or equal to the number of resources required by the second public RB configuration information, sets up, according to the first public RB configuration information, a public RB connecting the RNC and the UMTS terminal corresponding to the classification identifier; or if the number of resources required by the first public RB configuration information is greater than the number of resources required by the second public RB configuration information, sets up, according to the second public RB configuration information, a public RB connecting the RNC and the UMTS terminal corresponding to the classification identification. For example, the public bearer is formed by a public RAB and a public RB.

For example, the public RB includes a public SRB (Signaling radio bearer, signaling radio bearer) and a public DRB (Data radio bearer, data radio bearer). The RNC may transmit signaling with the UMTS terminal through the public SRB, and the RNC may transmit data with the UMTS terminal through the public DRB.

Correspondingly, both the first public RB configuration information and the second public RB configuration information include public SRB configuration information and public DRB configuration information.

In another embodiment of the present invention, if the public RAB assignment message received by the RNC further carries a parameter of an Iu interface, the RNC may further set up, according to the parameter of the Iu interface that is carried in the public RAB assignment message, based on the public RAB set up by the CN, an Iu interface connection between the RNC and the CN.

Correspondingly, the public bearer may also be formed by a public RAB, a public RB, and an Iu interface connection.

210: The RNC broadcasts an access start command after the first preset time threshold, where the access start command carries the classification identifier.

211: The UMTS terminal receives the access start command, and the UMTS terminal corresponding to the classification identifier performs an operation of releasing prohibition of accessing the network.

For example, the UMTS terminal receives the access start command, determines whether the UMTS terminal is a UMTS terminal corresponding to the classification identifier, and if yes, performs an operation of releasing prohibition of accessing the network.

212: The RNC broadcasts public RB configuration information, where the public RB configuration information is used to notify the UMTS terminal corresponding to the classification identifier to read the public bearer.

For example, the public RB configuration information includes public SRB configuration information and public DRB configuration information, where the public SRB configuration information is used to notify the UMTS terminal corresponding to the classification identifier to read the public SRB, and the public DRB configuration information is used to notify the UMTS terminal corresponding to the classification identifier to read the public DRB.

In another embodiment of the present invention, before the RNC broadcasts the public RB configuration information, the RNC notifies, by paging the UMTS terminal corresponding to the classification identifier, the UMTS terminal corresponding to the classification identifier to prepare to receive the public RB configuration information, and then the RNC broadcasts the public RB configuration information.

For example, the RNC may broadcast the public SRB configuration information and the public DRB configuration information to the UMTS terminal at the same time, and may also separately broadcast the public SRB configuration information and the public DRB configuration information to the UMTS terminal.

213: The UMTS terminal receives the public RB configuration information, and the UMTS terminal corresponding to the classification identifier sends an RB connection setup success message to the RNC after successfully reading the public bearer.

For example, in this embodiment, the RB connection setup success message may be one message, and may also include an SRB connection setup message and a DRB connection setup success message. For example, the UMTS terminal may send the SRB connection setup message and the DRB connection setup success message to the RNC at the same time, and may also separately send the SRB connection setup success message and the DRB connection setup success message to the RNC.

For example, in this embodiment, different public RB configuration information may further be pre-configured in each UMTS terminal, and a corresponding index is set for each kind of public RB configuration information.

Correspondingly, 212 may specifically be that, the RNC obtains an index corresponding to the public RB configuration information, and then broadcasts the obtained index, where the index is used to notify the UMTS terminal corresponding to the classification identifier to read the public bearer.

Then, the UMTS terminal receives the index broadcast by the RNC, and the UMTS terminal corresponding to the classification identifier obtains corresponding public RB configuration information according to the received index.

214: The RNC receives the RB connection setup success message sent by the UMTS terminal, and sends a public RAB assignment response message to the CN.

For example, the public RAB assignment response message is sent to the CN in the following two manners, which include:

First, the RNC counts the number of received RB connection setup success messages, calculates a percentage according to the counted number and the scale of the UMTS terminal, determines whether the calculated percentage exceeds a preset numerical value, and if the calculated percentage exceeds the preset numerical value, sends the public RAB assignment response message to the CN.

For example, if it is determined that the calculated percentage does not exceed the preset numerical value, an operation is ended.

For example, in this embodiment, if the RNC determines that the calculated percentage does not exceed the preset numerical value, the RNC may further broadcast the public RB configuration information again, and then 213 is performed again. When the number of times of continuously broadcasting the public RB configuration information by the RNC exceeds a preset number of times, and the percentage still does not exceed the preset numerical value, the RNC notifies the CN to cancel setup of the public bearer.

Second, when receiving the RB connection setup success message for the first time, the RNC starts timing, and after a timing period reaches a second preset time threshold, sends the public RAB assignment response message to the CN.

215: The CN receives the public RAB assignment response message, and sends an activation PDP context request acceptance message to the RNC, where the activation PDP context request acceptance message is used to notify the UMTS terminal corresponding to the classification identifier to access, through the public bearer that is set up, the network.

216: The RNC receives the activation PDP context request acceptance message sent by the CN, and broadcasts the activation PDP context request acceptance message to the UMTS terminal.

217: The UMTS terminal receives the activation PDP context request acceptance message, and the UMTS terminal corresponding to the classification identifier accesses the network through the public bearer according to the public RB configuration information, and starts to send data.

In the embodiment of the present invention, an RNC receives an RRC connection request carrying a classification identifier, determines whether to set up a public bearer for multiple UMTS terminals corresponding to the classification identifier, and if yes, replaces the multiple UMTS terminals corresponding to the classification identifier to send a public PDP context activation assignment message to a core network (CN). The CN sets up a public RAB among the CN, the RNC, and a UMTS terminal corresponding to the classification identifier. The RNC sets up, based on the public RAB, an Iu interface connection and a public RB to obtain the public bearer. The UMTS terminal accesses the CN through the public bearer. In this way, in order to access the network, each UMTS terminal corresponding to the same classification identifier does not need to perform signaling interaction with the RNC for multiple times, and the RNC does not need to perform signaling interaction with the CN for multiple times, so that a signaling storm can be avoided, a load of a network can be reduced, and QoS quality of service can be improved.

Figure 3:
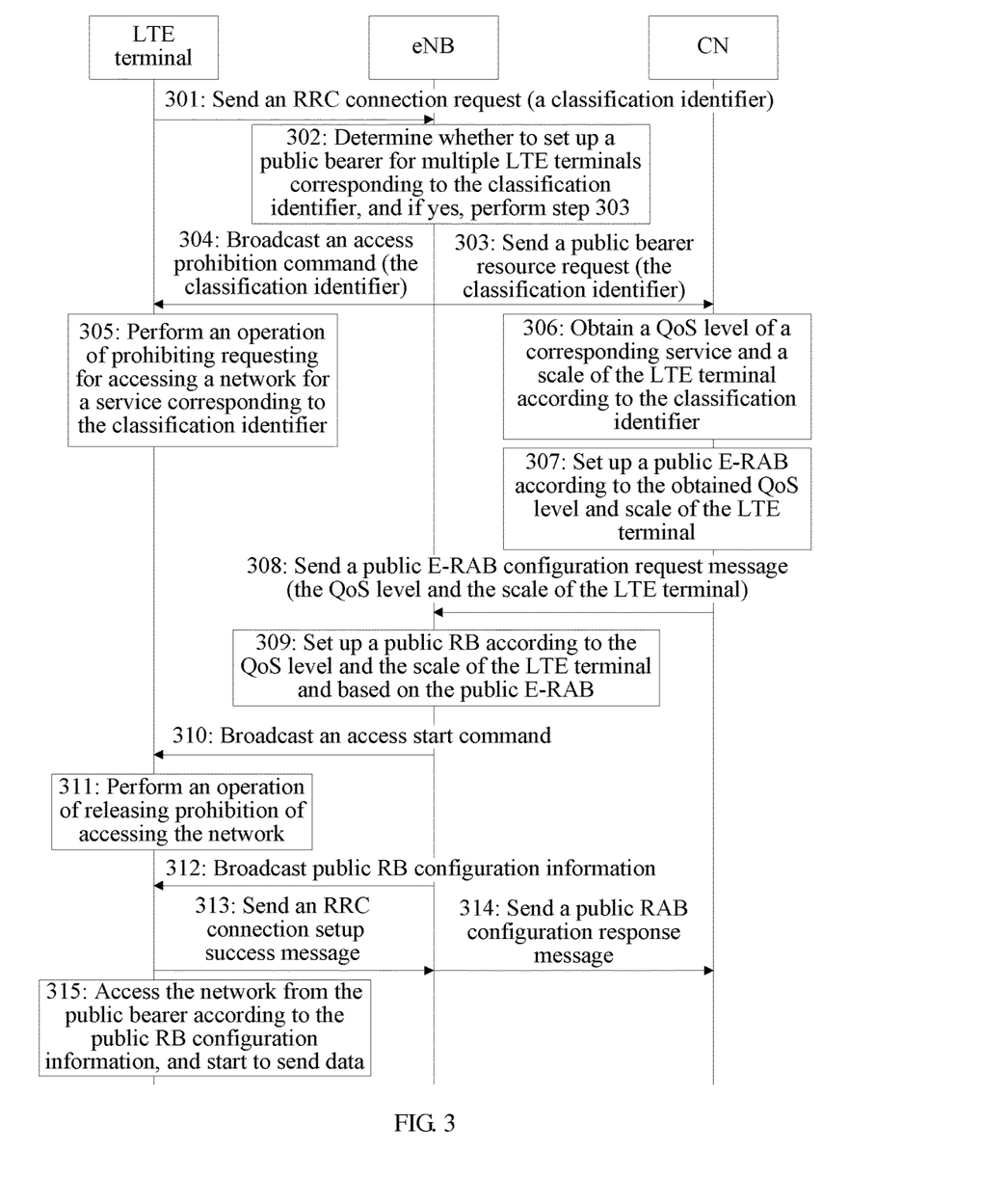
FIG. 3 is a flowchart of a control method for access of multiple terminals according to another embodiment of the present invention.

Another embodiment of the present invention provides a control method for access of multiple terminals. The present invention is applied to an LTE system, as shown in FIG. 3.

301: An LTE terminal sends an RRC connection request to an eNB (evolved NodeB, evolved base station), where the RRC connection request carries a classification identifier that is for the LTE terminal to process a service.

For example, a terminal in an LTE system is called an LTE terminal. When processing a certain service, an LTE terminal needs to report the service processed by the LTE terminal to a network, and before reporting the service processed by the LTE terminal, the LTE terminal needs to set up a connection with the network to access the network.

302: The eNB receives the RRC connection request, and determines whether to set up a public bearer for multiple LTE terminals corresponding to the classification identifier, and if yes, performs 303.

For example, the eNB receives the RRC connection request, obtains, according to the classification identifier carried in the RRC connection request, a time window in corresponding service information from pre-configured correspondence between a classification identifier and service information, and determines, according to the obtained time window and time for receiving the RRC connection request, whether to set up the public bearer for the multiple LTE terminals corresponding to the classification identifier.

In another embodiment of the present invention, when the eNB determines to set up a public bearer for an LTE terminal corresponding to the classification identifier, the eNB neglects, in a first preset time threshold, an RRC connection request that carries the classification identifier and is sent by the LTE terminal corresponding to the classification identifier. For example, the first preset time threshold is greater than or equal to time for setting up the public bearer.

303: The eNB sends a public bearer resource request to a core network (CN), where the public bearer resource request carries the classification identifier.

For example, the eNB replaces all LTE terminals corresponding to the classification identifier to send a public bearer resource request to the CN, where the public bearer resource request is used to request the CN to set up a public E-RAB for the LTE terminal corresponding to the classification identifier, and the public E-RAB connects the CN, the eNB, and the LTE terminal corresponding to the classification identifier.

For example, the public bearer resource request may be Common Request Bear Resource.

304: The eNB broadcasts an access prohibition command, where the access prohibition command carries the classification identifier.

In another embodiment of the present invention, before broadcasting the access prohibition command, the eNB may further obtain an LTE terminal corresponding to the classification identifier from the CN, and notify, by paging the LTE terminal corresponding to the classification identifier, the LTE terminal corresponding to the classification identifier to prepare to receive the access prohibition command, and then the eNB broadcasts the access prohibition command.

In this embodiment, 303 and 304 may occur at the same time, and there is no time sequence for performing 303 and 304.

305: The LTE terminal receives the access prohibition command, and the LTE terminal corresponding to the classification identifier performs an operation of prohibiting requesting for accessing a network for a service corresponding to the classification identifier.

For example, the LTE terminal receives the access prohibition command, determines, according to the classification identifier carried in the access prohibition command, whether the LTE terminal is a terminal corresponding to the classification identifier, and if yes, performs an operation of prohibiting requesting for accessing a network for a service corresponding to the classification identifier, that is, prohibiting retransmitting the RRC connection request carrying the classification identifier to the eNB.

For example, in this embodiment, by broadcasting the access prohibition command, the eNB enables the multiple LTE terminals corresponding to the classification identifier to stop continuously requesting for accessing a network for a service corresponding to the classification identifier, that is, stop the LTE terminal corresponding to the classification identifier from performing uplink and downlink signaling interaction with the network. In addition, the eNB further replaces the LTE terminal corresponding to the classification identifier to send a public bearer resource request to the CN and request the CN to set up a public bearer, so that a signaling storm is avoided, a load of a network is reduced, and a QoS level is improved.

For example, in this embodiment, the eNB may also set that a Pageing message or another message carries the classification identifier, and then notify, through the Pageing message or another message, the LTE terminal corresponding to the classification identifier to prohibit requesting for accessing the network for the service corresponding to the classification identifier.

For example, in this embodiment, the eNB may also not perform 304 and 305, but when the eNB determines to set up a public bearer for a terminal corresponding to the classification identifier, the eNB sends a public bearer resource request to the CN, and neglects, in first preset time, an RRC connection request that carries the classification identifier and is sent by another LTE terminal, and then, 306 is directly performed.

306: The CN receives the public bearer resource request, and obtains, according to the classification identifier carried in the public bearer resource request, a QoS level of a corresponding service and a scale of the LTE terminal corresponding to the classification identifier.

For example, the CN receives the public bearer resource request, and obtains, according to the classification identifier carried in the public bearer resource request, a Qos level and a scale of an LTE terminal in corresponding service information from stored correspondence between a classification identifier and service information.

307: The CN sets up, according to the obtained QoS level and scale of the LTE terminal, a public E-RAB for the LTE terminal corresponding to the classification identifier.

For example, the public E-RAB is used to connect the CN, the eNB, and the LTE terminal corresponding to the classification identifier.

308: In a process of setting up the public E-RAB, the CN sends a public E-RAB configuration request message to the eNB, where the public E-RAB configuration request message carries at least the obtained QoS level and scale of the LTE terminal.

For example, the public E-RAB configuration request message may be CommonE-RAB Setup Request.

In another embodiment of the present invention, the public E-RAB configuration request message sent by the CN to the eNB may further carry a parameter of an Iu interface through which the public E-RAB passes.

309: The eNB sets up, according to the QoS level and the scale of the LTE terminal that are carried in the public E-RAB configuration request message, based on the public E-RAB set up by the CN, a public RB on an air interface, and in this way, the setup of the public bearer is completed.

For example, the eNB determines first public RB configuration information according to the QoS level and the scale of the LTE terminal that are carried in the public E-RAB configuration request message, obtains a current congestion situation of the eNB, determines second public RB configuration information according to the obtained congestion situation, and if the number of resources required by the first public RB configuration information is smaller than or equal to the number of resources required by the second public RB configuration information, sets up, according to the first public RB configuration information, a public RB connecting the eNB and the LTE terminal corresponding to the classification identifier; or if the number of resources required by the first public RB configuration information is greater than the number of resources required by the second public RB configuration information, sets up, according to the second public RB configuration information, a public RB connecting the eNB and the LTE terminal corresponding to the classification identification.

For example, the public RB includes a public SRB and a public DRB. The eNB may transmit signaling with the LTE terminal through the public SRB, and the eNB may transmit data with the LTE terminal through the public DRB.

Correspondingly, both the first public RB configuration information and the second public RB configuration information include public SRB configuration information and public DRB configuration information.

In another embodiment of the present invention, if the public E-RAB configuration request message received by the eNB further carries a parameter of an Iu interface, the eNB may further set up, according to the parameter of the Iu interface that is carried in the public E-RAB configuration request message, based on the public E-RAB set up by the CN, an Iu interface connection between the eNB and the CN.

310: The eNB broadcasts an access start command after the first preset time threshold, where the access start command carries the classification identifier.

311: The LTE terminal receives the access start command, and the LTE terminal corresponding to the classification identifier performs an operation of releasing prohibition of accessing the network.

For example, the LTE terminal receives the access start command, determines whether the LTE terminal is an LTE terminal corresponding to the classification identifier, and if yes, performs an operation of releasing prohibition of accessing the network.

312: The eNB broadcasts public RB configuration information, where the public RB configuration information is used to notify the LTE terminal corresponding to the classification identifier to read the public bearer.

For example, the public RB configuration information includes public SRB configuration information and public DRB configuration information.

In another embodiment of the present invention, before the eNB broadcasts the public RB configuration information, the eNB notifies, by paging the LTE terminal corresponding to the classification identifier, the LTE terminal corresponding to the classification identifier to prepare to receive the public RB configuration information, and then the eNB broadcasts the public RB configuration information.

For example, the eNB may broadcast the public SRB configuration information and the public DRB configuration information to the LTE terminal at the same time, and may also separately broadcast the public SRB configuration information and the public DRB configuration information to the LTE terminal.

313: The LTE terminal receives the public RB configuration information, and the LTE terminal corresponding to the classification identifier sends an RRC connection setup success message to the eNB.

314: The eNB receives the RRC connection setup success message sent by the LTE terminal, and sends a public RAB configuration response message to the CN.

For example, the public RAB configuration response message is sent to the CN in the following two manners, which include:

First, the eNB counts the number of received RRC connection setup success messages, calculates a percentage according to the counted number and the scale of the LTE terminal, determines whether the calculated percentage exceeds a preset threshold, and if the calculated percentage exceeds the preset threshold, sends the public RAB configuration response message to the CN.

For example, if it is determined that the calculated percentage does not exceed the preset threshold, an operation is ended.

Second, when receiving a first RRC connection setup success message, the eNB starts timing, and after a timing period reaches a second preset time threshold, sends the public RAB configuration response message to the CN.

315: The LTE terminal corresponding to the classification identifier accesses the network through the public bearer according to the public RB configuration information, and starts to send data.

In the embodiment of the present invention, an eNB receives an RRC connection request carrying a classification identifier, determines to set up a public bearer for a terminal corresponding to the classification identifier, and replaces an LTE terminal corresponding to the classification identifier to send a public PDP context activation request to a core network (CN). The CN sets up a public RAB among the CN, the eNB, and the LTE terminal corresponding to the classification identifier. The eNB sets up, based on the public RAB, an Iu interface connection and a public RB to obtain the public bearer. The LTE terminal accesses the CN through the public bearer. In this way, in order to access the CN, each LTE terminal corresponding to the same classification identifier does not need to perform signaling interaction with the eNB for multiple times, and the eNB does not need to perform signaling interaction with the CN for multiple times, so that a signaling storm can be avoided, a load at a network can be reduced, and QoS quality of service can be improved.

Figure 4:
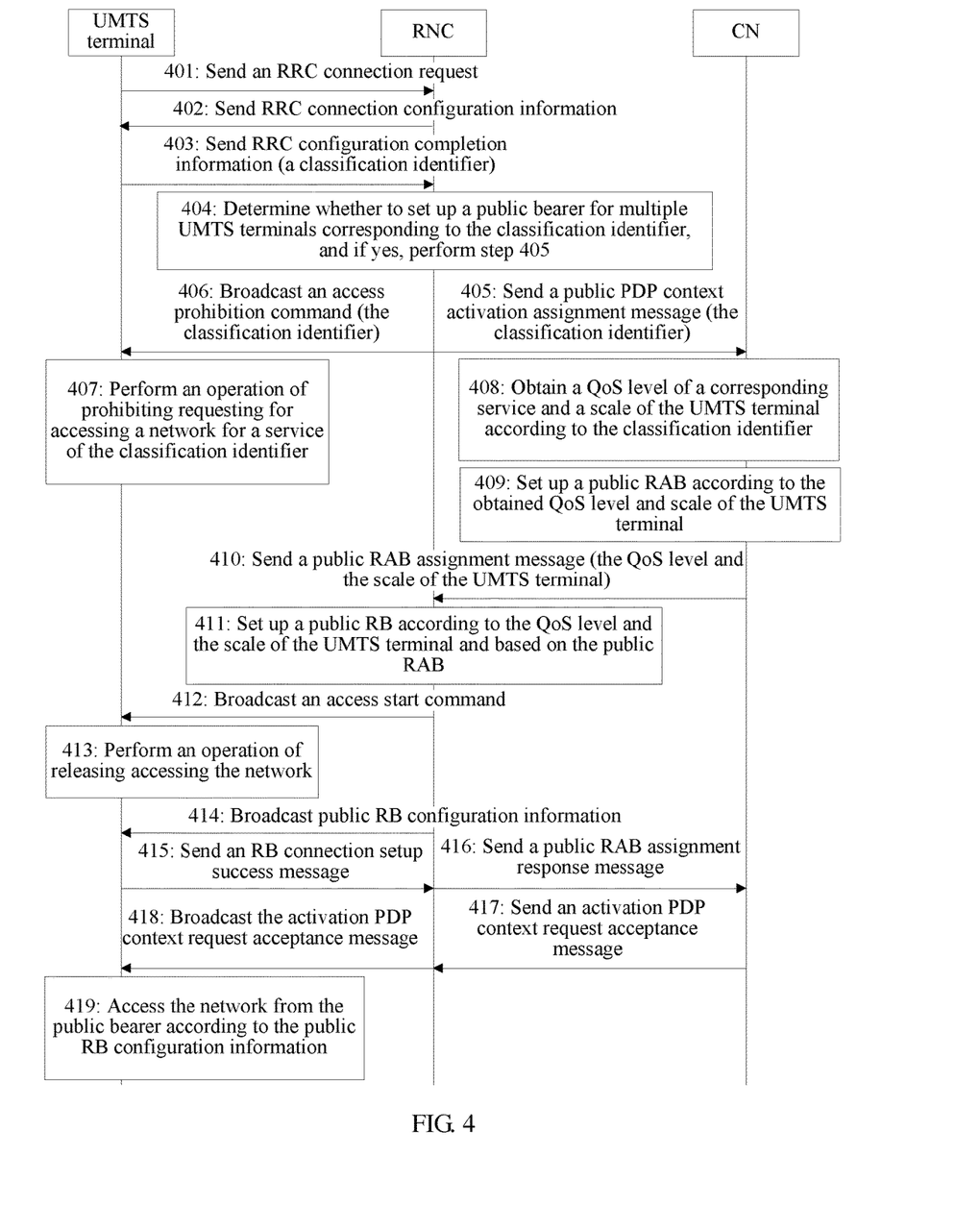
FIG. 4 is a flowchart of a control method for access of multiple terminals according to another embodiment of the present invention.

Another embodiment of the present invention provides a control method for access of multiple terminals. The present invention is applied to a UMTS system, and referring to FIG. 4, the method includes:

401: A UMTS terminal sends an RRC connection request to an RNC.

For example, because many services exist in the Internet of Things, a byte occupied by a classification identifier is always too long. The length of an RRC connection request is limited, so that the RRC connection request cannot carry a classification identifier; therefore, in this embodiment, it is set that the RRC connection request does not carry a classification identifier.

402: The RNC receives the RRC connection request, and sends RRC connection configuration information to the UMTS terminal.

403: The UMTS terminal receives the RRC connection configuration information, and sends RRC configuration completion information to the RNC, where the RRC configuration completion information carries a classification identifier.

For example, a byte occupied by the RRC configuration completion information is not limited; therefore, in this embodiment, it may be set that the RRC configuration completion information carries a classification identifier.

404: The RNC receives the RRC configuration completion information, and determines whether to set up a public bearer for an LTE terminal corresponding to the classification identifier, and if yes, performs 405.

For example, a process in which the RNC determines whether to set up the public bearer for the LTE terminal corresponding to the classification identifier is the same as corresponding content in 202 in Embodiment 2, which is not described herein again.

405 to 419 are respectively the same as 202 to 217, which are not described herein again.

In the embodiment of the present invention, an RNC receives RRC configuration completion information carrying a classification identifier, determines to set up a public bearer for multiple UMTS terminals corresponding to the classification identifier, and replaces the multiple UMTS terminals corresponding to the classification identifier to send a public PDP context activation request to a core network (CN). The CN sets up a public RAB among the CN, the RNC, and a UMTS terminal corresponding to the classification identifier. The RNC sets up, based on the public RAB, an Iu interface connection and a public RB to obtain the public bearer. The UMTS terminal accesses the CN through the public bearer. In this way, in order to access the CN, each UMTS terminal corresponding to the same classification identifier does not need to perform signaling interaction with the RNC for multiple times, and the RNC does not need to perform signaling interaction with the CN for multiple times, so that a signaling storm can be avoided, a load at a network can be reduced, and QoS quality of service can be improved.

Figure 5:
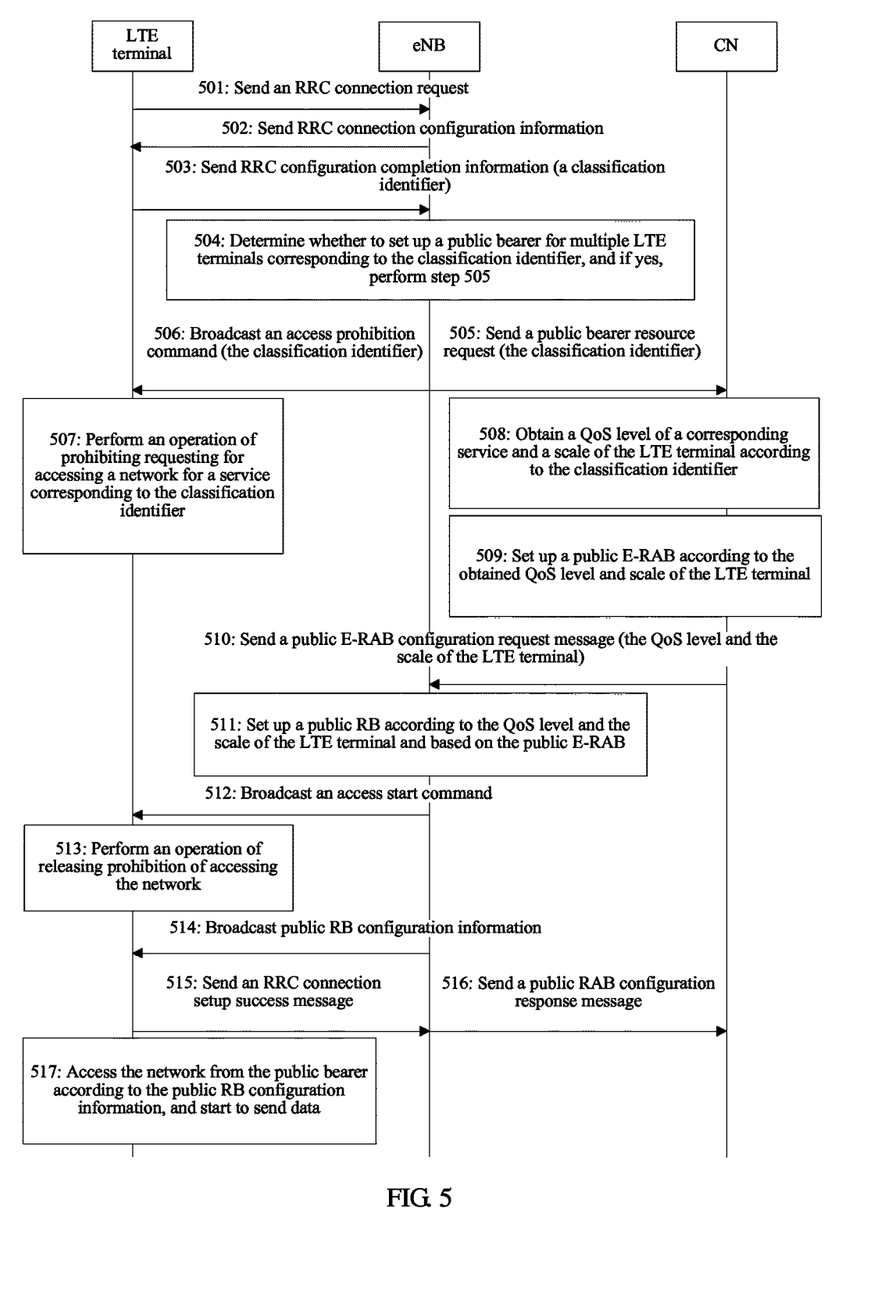
FIG. 5 is a flowchart of a control method for access of multiple terminals according to another embodiment of the present invention.

Another embodiment of the present invention provides a control method for access of multiple terminals. The present invention is applied to an LTE system, as shown in FIG. 5.

501: An LTE terminal sends an RRC connection request to an eNB.

For example, because many services exist in the Internet of Things, a byte occupied by a classification identifier is always too long. The length of an RRC connection request is limited, so that the RRC connection request cannot carry a classification identifier; therefore, in this embodiment, it is set that the RRC connection request does not carry a classification identifier.

502: The eNB receives the RRC connection request, and sends RRC connection configuration information to the LTE terminal.

503: The LTE terminal receives the RRC connection configuration information, and sends RRC configuration completion information to the eNB, where the RRC configuration completion information carries a classification identifier.

For example, a byte occupied by the RRC configuration completion information is not limited; therefore, in this embodiment, it may be set that the RRC configuration completion information carries a classification identifier.

504: The eNB receives the RRC configuration completion information, and if the RRC configuration completion information carrying the classification identifier is received for the first time, determines, according to the classification identifier carried in the RRC configuration completion information, whether to set up a public bearer for an LTE terminal corresponding to the classification identifier, and if yes, performs 505.

For example, a process in which the eNB determines whether to set up the public bearer for the LTE terminal corresponding to the classification identifier is the same as corresponding content in 302 in Embodiment 3, which is not described herein again.

505 to 517 are respectively the same as 302 to 315, which are not described herein again.

In the embodiment of the present invention, an eNB receives RRC configuration completion information carrying a classification identifier, determines to set up a public bearer for a terminal corresponding to the classification identifier, and replaces an LTE terminal corresponding to the classification identifier to send a public PDP context activation request to a core network (CN). The CN sets up a public RAB among the CN, the eNB, and the LTE terminal corresponding to the classification identifier. The eNB sets up, based on the public RAB, an Iu interface connection and a public RB to obtain the public bearer. The LTE terminal accesses the CN through the public bearer. In this way, in order to access the CN, each LTE terminal corresponding to the same classification identifier does not need to perform signaling interaction with the eNB for multiple times, and the eNB does not need to perform signaling interaction with the CN for multiple times, so that a signaling storm can be avoided, a load at a network can be reduced, and QoS quality of service can be improved.

Figure 6:
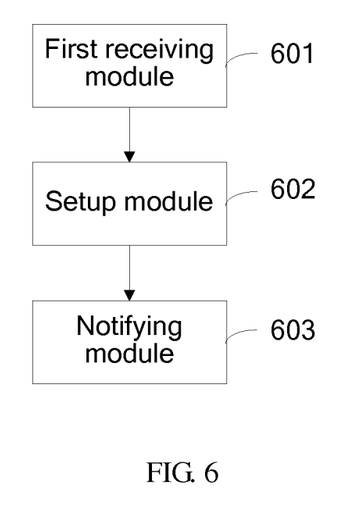
FIG. 6 is a schematic diagram of a control device for access of multiple terminals according to another embodiment of the present invention.

As shown in FIG. 6, an embodiment of the present invention provides a control device for access of multiple terminals, where the control device may be an RNC in a UMTS or an eNB in LTE, and the control device includes: a first receiving module 601, a setup module 602, and a notifying module 603.

The first receiving module 601 is configured to receive an access request, where the access request carries a classification identifier.

The setup module 602 is configured to set up a public bearer for a terminal corresponding to the classification identifier.

The notifying module 603 is configured to notify the terminal corresponding to the classification identifier, so that the terminal corresponding to the classification identifier accesses a network through the public bearer.

In another embodiment of the present invention, the setup module 602 further includes: a sending unit and a setup unit.

The sending unit is configured to send a public resource request carrying the classification identifier to a core network (CN), so that the CN sets up a public radio access bearer for the terminal corresponding to the classification identifier.

The setup unit is configured to receive a public radio access bearer assignment message that is sent when the CN sets up the public radio access bearer, and set up a public radio bearer on an air interface for the terminal corresponding to the classification identifier. The public bearer includes a public radio access bearer and a public radio bearer.

In another embodiment of the present invention, the control device further includes: a determining module, configured to determine whether to set up the public bearer for the terminal corresponding to the classification identifier.

In another embodiment of the present invention, the determining module further includes: an obtaining unit and a determining unit.

The obtaining unit is configured to obtain, according to stored correspondence between a classification identifier and service information, a time window in service information corresponding to the classification identifier.

The determining unit is configured to: if time for receiving the access request is in the obtained time window, determine to set up the public bearer for the terminal corresponding to the classification identifier.

In another embodiment of the present invention, the control device further includes a neglecting module, configured to neglect, in a first preset time threshold, an access request that carries the classification identifier and is sent by the terminal corresponding to the classification identifier.

In another embodiment of the present invention, the control device further includes:

a first broadcasting module, configured to broadcast an access prohibition command, where the access prohibition command is used to instruct the terminal corresponding to the classification identifier to perform an operation of prohibiting requesting for accessing a network for a service corresponding to the classification identifier.

In another embodiment of the present invention, the control device further includes:

a second broadcasting module, configured to broadcast an access start command after the first preset time threshold, where the access start command is used to instruct the terminal corresponding to the classification identifier to perform an operation of releasing prohibition of accessing the network.

In another embodiment of the present invention, the control device further includes a first sending module, configured to receive a radio bearer connection setup success message sent by the terminal corresponding to the classification identifier; count the number of received radio bearer connection setup success messages; calculate a percentage according to the counted number and a scale of the terminal corresponding to the classification identifier; and if the calculated percentage exceeds a preset numerical value, send a public radio bearer response message to the CN.

In another embodiment of the present invention, the control device further includes a second sending module, configured to: when a radio bearer connection setup success message sent by the terminal corresponding to the classification identifier is received for the first time, start timing; and after a timing period reaches a second preset time threshold, send a public radio bearer response message to the CN.

In the embodiment of the present invention, an access request carrying a classification identifier is received, and a public bearer is set up for a terminal corresponding to the classification identifier, so that the terminal accesses a network through the public bearer that is set up. In this way, each terminal corresponding to the same classification identifier can access a network without performing signaling interaction with the network for multiple times, so that a signaling storm can be avoided, a load of a network can be reduced, and QoS quality of service can be improved.

Figure 7:
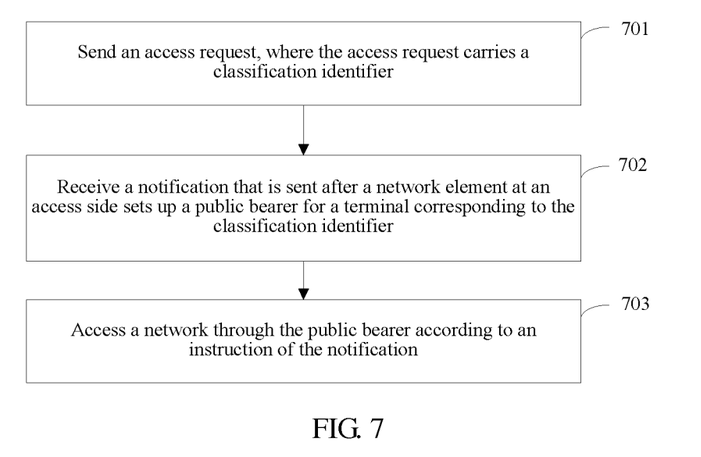
FIG. 7 is a flowchart of a control method for access of multiple terminals according to another embodiment of the present invention.

As shown in FIG. 7, another embodiment of the present invention provides a control method for access of multiple terminals, which includes:

701: Send an access request, where the access request carries a classification identifier.

702: Receive a notification that is sent after a network element at an access side sets up a public bearer for a terminal corresponding to the classification identifier.

In this embodiment, the network element at the access side may be a control device for access of multiple terminals, an RNC, or an eNB.

703: Access a network through the public bearer according to an indication of the notification.

In another embodiment of the present invention, after the sending an access request, the method further includes:

receiving an access prohibition command broadcast by the network element at the access side, and performing an operation of prohibiting requesting for accessing a network for a service corresponding to the classification identifier.

In another embodiment of the present invention, after the receiving an access prohibition command, the method further includes:

receiving an access start command broadcast by the network element at the access side, and performing an operation of releasing prohibition of accessing the network.

In the embodiment of the present invention, an access request carrying a classification identifier is sent, so that a network element at an access side sets up a public bearer for a terminal corresponding to the classification identifier, and a network is accessed according to the public bearer that is set up. In this way, each terminal corresponding to the same classification identifier can access a network without performing signaling interaction with the network for multiple times, so that a signaling storm can be avoided, a load of a network can be reduced, and QoS quality of service can be improved.

Figure 8:
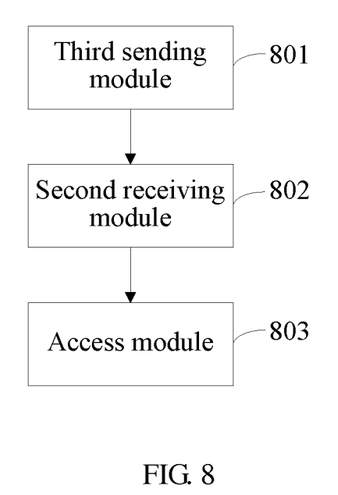
FIG. 8 is a schematic structural diagram of a terminal according to another embodiment of the present invention.

As shown in FIG. 8, another embodiment of the present invention provides a terminal, which includes a third sending module 801, a second receiving module 802, and an access module 803.

The third sending module 801 is configured to send an access request, where the access request carries a classification identifier.

The second receiving module 802 is configured to receive a notification that is sent after a network element at an access side sets up a public bearer for a terminal corresponding to the classification identifier.

The access module 803 is configured to access a network through the public bearer according to an indication of the notification.

In another embodiment of the present invention, the terminal further includes a prohibition module.

The prohibition module is configured to receive an access prohibition command broadcast by the network element at the access side, and perform an operation of prohibiting requesting for accessing a network for a service corresponding to the classification identifier.

In another embodiment of the present invention, the terminal further includes a releasing module.

The releasing module is configured to receive an access start command broadcast by the network element at the access side, and perform an operation of releasing prohibition of accessing the network.

In the embodiment of the present invention, an access request carrying a classification identifier is sent, so that a network element at an access side sets up a public bearer for a terminal corresponding to the classification identifier, and a network is accessed according to the public bearer that is set up. In this way, each terminal corresponding to the same classification identifier can access a network without performing signaling interaction with the network for multiple times, so that a signaling storm can be avoided, a load of a network can be reduced, and QoS quality of service can be improved.

Figure 9:
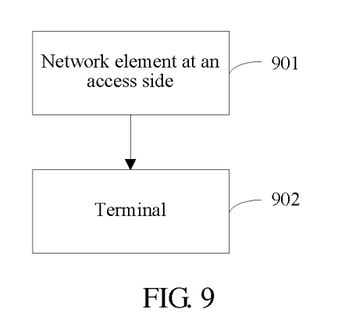
FIG. 9 is a schematic diagram of a control system for access of multiple terminals according to another embodiment of the present invention.

As shown in FIG. 9, another embodiment of the present invention provides a control system for access of multiple terminals, where the control system includes a network element at an access side 901 and a terminal 902.

The network element at the access side 901 is configured to receive an access request, where the access request carries a classification identifier; set up a public bearer for a terminal corresponding to the classification identifier; and notify the terminal corresponding to the classification identifier.

The terminal 902 is configured to send the access request; receive a notification of the network element of the access side; and access a network through the public bearer according to an indication of the notification.

In the embodiment of the present invention, the terminal sends an access request carrying a classification identifier, the network element at the access side sets up a public bearer for a terminal corresponding to the classification identifier, and then the terminal accesses a network according to the public bearer that is set up. In this way, each terminal corresponding to the same classification identifier can access a network without performing signaling interaction with the network for multiple times, so that a signaling storm can be avoided, a load of a network can be reduced, and QoS quality of service can be improved.

It may be clearly understood by persons skilled in the art that, for the purpose of convenient and brief description, for a detailed working process of the foregoing system, apparatus, and unit, reference may be made to a corresponding process in the foregoing method embodiments, which is not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, multiple units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on multiple network units. A part or all of the units may be selected according to an actual need to achieve the objectives of the solutions in the embodiments.

In addition, functional units in the embodiments of the present invention may be integrated into one processing unit, or each of the units may exist alone physically, or two or more units are integrated into one unit. The integrated unit may be implemented in the form of hardware, or may be implemented in the form of a software functional unit.

When the integrated unit is implemented in the form of a software functional unit and sold or used as an independent product, the integrated unit may be stored in a computer-readable storage medium. Based on such an understanding, the technical solutions of the present invention essentially, or the part contributing to the prior art, or all or a part of the technical solutions may be implemented in the form of a software product. The computer software product is stored in a storage medium, and includes several indications for instructing a computer device (which may be a personal computer, a server, a network device, or the like) to perform all or a part of the steps of the methods described in the embodiments of the present invention. The foregoing storage medium includes: any medium that can store program codes, such as a USB flash disk, a removable hard disk, a read-only memory (ROM, Read-Only Memory), a random access memory (RAM, Random Access Memory), a magnetic disk, or an optical disk.

The foregoing descriptions are merely specific embodiments of the present invention, but are not intended to limit the protection scope of the present invention. Any variation or replacement readily figured out by persons skilled in the art within the technical scope disclosed in the present invention shall all fall within the protection scope of the present invention. Therefore, the protection scope of the present invention shall be subject to the protection scope of the claims.

What is claimed is:

1. A control method for access of multiple terminals, comprising:
   receiving an access request from a terminal among the multiple terminals corresponding to a classification identifier for the multiple terminals, wherein the access request carries the classification identifier for the multiple terminals;
   determining whether to set up the public bearer for the multiple terminals corresponding to the classification identifier;
   setting up the public bearer, upon determining to set up the public bearer, for the multiple terminals corresponding to the classification identifier;
   broadcasting, after setting up the public bearer, an access prohibition command, wherein the access prohibition command is used to instruct the multiple terminals corresponding to the classification identifier to perform an operation of prohibiting requesting for accessing a network for a service corresponding to the classification identifier, thereby avoiding a signaling storm and improving quality of service; and
   notifying the terminal among the multiple terminals corresponding to the classification identifier, so that the terminal corresponding to the classification identifier accesses the network through the public bearer.

2. The control method according to claim 1, further comprising:
   sending a public resource request carrying the classification identifier to a core network (CN), so that the CN sets up a public radio access bearer for the terminal corresponding to the classification identifier; and
   receiving a public radio access bearer assignment message that is sent when the CN sets up the public radio access bearer, and setting up a public radio bearer on an air interface for the terminal corresponding to the classification identifier.

3. The control method according to claim 1, further comprising:
   obtaining, according to stored correspondence between a classification identifier and service information, a time window in service information corresponding to the classification identifier; and
   determining to set up the public bearer for the terminal corresponding to the classification identifier if time for receiving the access request is in the obtained time window.

4. The control method according to claim 1, further comprising:
   neglecting, in a first preset time threshold, an access request that carries the classification identifier and is sent by the terminal corresponding to the classification identifier.

5. The control method according to claim 1, further comprising:
   broadcasting an access start command after a first preset time threshold, wherein the access start command is used to instruct the terminal corresponding to the classification identifier to perform an operation of releasing prohibition of accessing the network.

6. The control method according to claim 1, further comprising:
   receiving a radio bearer connection setup success message sent by the terminal corresponding to the classification identifier, and counting the number of received radio bearer connection setup success messages; and
   calculating a percentage according to the counted number and a scale of the terminal corresponding to the classification identifier, and sending a public radio bearer response message to a core network (CN) if the percentage exceeds a preset numerical value.

7. The control method according to claim 1, further comprising:
   starting timing when a radio bearer connection setup success message sent by the terminal corresponding to the classification identifier is received for the first time, and sending a public radio bearer response message to a core network (CN) after a timing period reaches a second preset time threshold.

8. A control device for access of multiple terminals, comprising:
   a receiver, configured to receive an access request, wherein the access request carries a classification identifier for the multiple terminals;
   a processor, configured to:
     determine whether to set up the public bearer for the multiple terminals corresponding to the classification identifier; and
     set up the public bearer, upon determining to set up the public bearer, for the multiple terminals corresponding to the classification identifier; and
   a transmitter, configured to:
     broadcast an access prohibition command, wherein the access prohibition command is used to instruct the multiple terminals corresponding to the classification identifier to perform an operation of prohibiting requesting for accessing a network for a service corresponding to the classification identifier, thereby avoiding a signaling storm and improving quality of service; and
     notify a terminal among the multiple terminals corresponding to the classification identifier, so that the terminal corresponding to the classification identifier accesses a network through the public bearer.

9. The control device according to claim 8, wherein,
   the transmitter is further configured to send a public resource request carrying the classification identifier to a core network (CN), so that the CN sets up a public radio access bearer for the terminal corresponding to the classification identifier;
   the receiver is further configured to receive a public radio access bearer assignment message that is sent when the CN sets up the public radio access bearer; and
   the processor is further configured to set up a public radio bearer on an air interface for the terminal corresponding to the classification identifier.

10. The control device according to claim 8, wherein,
the processor is further configured to obtain, according to stored correspondence between a classification identifier and service information, a time window in service information corresponding to the classification identifier; and further configured to: determine to set up the public bearer for the terminal corresponding to the classification identifier if time for receiving the access request is in the obtained time window.

11. The control device according to claim 8, wherein, the processor is further configured to neglect, in a first preset time threshold, an access request that carries the classification identifier and is sent by the terminal corresponding to the classification identifier.

12. The control device according to 8, wherein,
the transmitter is further configured to broadcast an access start command after the first preset time threshold, wherein the access start command is used to instruct the terminal corresponding to the classification identifier to perform an operation of releasing prohibition of accessing the network.

13. The control device according to claim 8, wherein
the receiver is further configured to receive a radio bearer connection setup success message sent by the terminal corresponding to the classification identifier;
the processor is further configured to count the number of received radio bearer connection setup success messages and calculate a percentage according to the counted number and a scale of the terminal corresponding to the classification identifier; and
the transmitter is further configured to send a public radio bearer response message to a core network (CN) if the calculated percentage exceeds a preset numerical value.

14. The control device according to claim 8, wherein,
the processor is further configured to start timing when a radio bearer connection setup success message sent by the terminal corresponding to the classification identifier is received for the first time; and
the transmitter is further configured to send a public radio bearer response message to a core network (CN) after a timing period reaches a second preset time threshold.

15. A control method for access of multiple terminals, comprising:
sending an access request, wherein the access request carries a classification identifier for the multiple terminals;
receiving, by a terminal among the multiple terminals, a notification that is sent after a network element at an access side sets up a public bearer for the multiple terminals corresponding to the classification identifier; and
accessing, by the terminal, a network through the public bearer according to an indication of the notification,
receiving an access prohibition command broadcast by the network element at the access side, and performing an operation of prohibiting requesting for accessing a network for a service corresponding to the classification identifier, thereby avoiding a signaling storm and improving quality of service.

16. The control method according to claim 15, further comprising:
receiving an access start command broadcast by the network element at the access side, and performing an operation of releasing prohibition of accessing the network.

17. A terminal, comprising:
a transmitter, configured to send an access request, wherein the access request carries a classification identifier for multiple terminals including the terminal;
a receiver, configured to:
receive an access prohibition command broadcast by the network element at the access side; and
receive a notification that is sent after a network element at an access side sets up a public bearer for the multiple terminals corresponding to the classification identifier; and
a processor, configured to:
perform an operation of prohibiting requesting for accessing a network for a service corresponding to the classification identifier, thereby avoiding a signaling storm and improving quality of service; and
access a network through the public bearer according to an indication of the notification.

18. The terminal according to claim 17, wherein,
the receiver is further configured to receive an access start command broadcast by the network element at the access side; and
the processor is further configured to perform an operation of releasing prohibition of accessing the network.

* * * * *